March 1, 1932.  H. D. GEYER  1,847,758

STEERING WHEEL

Original Filed Aug. 29, 1927

Inventor
Harvey D. Geyer
By Spencer Hardman & Fehr
his Attorneys

Patented Mar. 1, 1932

1,847,758

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

STEERING WHEEL

Application filed August 29, 1927, Serial No. 216,116. Renewed August 16, 1929.

This invention relates to improvements in hand-wheels, especially such as are used as steering wheels on motor vehicles.

An object of this invention is to provide a strong efficient steering wheel having both the rim and spider portions of vulcanized rubber and with metal reinforcements in all the parts thereof.

Another object is to provide such a steering wheel having a relatively large central aperture adapted to receive a correspondingly large separate hub member.

Another object is to materially reduce the vibrations in the portions of the steering wheel which are grasped by the hands of the driver by interposing a soft rubber bushing between the hub which is fixed to the steering shaft and the central portion of the spider and at the same time providing means for positively transmitting torque from the spider to the hub.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the drawings.

Figure 1:
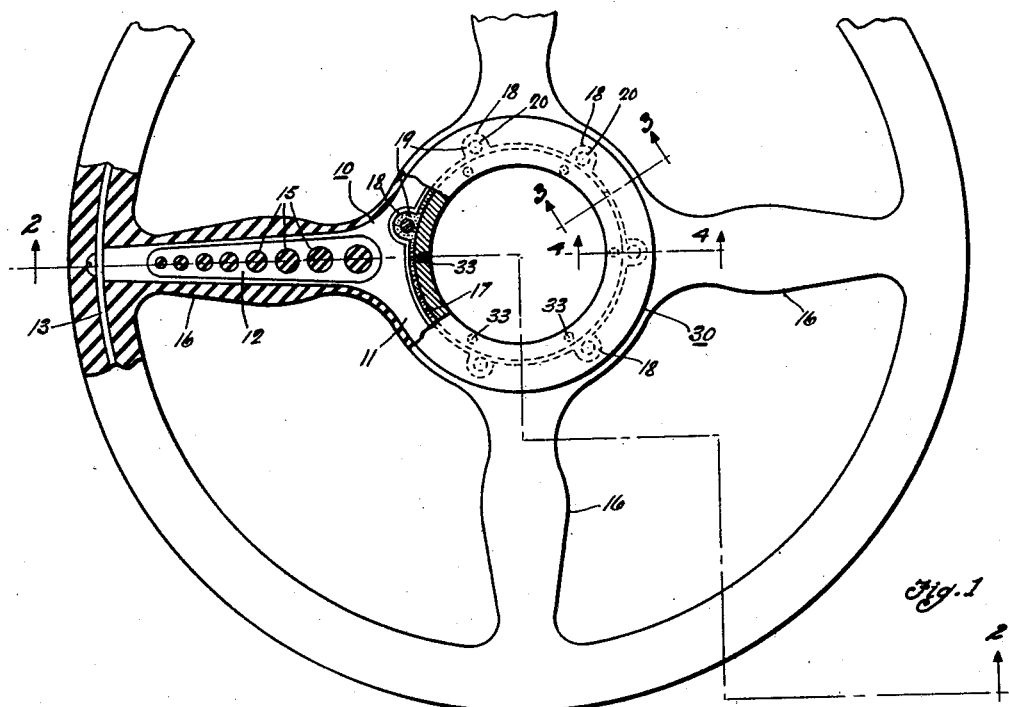
Fig. 1 is a partial plan view of an automobile steering wheel built according to this invention but shows a portion in section to illustrate the interior construction.

The spider reinforcing member 10, which may be of die cast aluminum or malleable iron, comprises a central ring 11 of a relatively large diameter and the four arms 12 radiating therefrom. A steel hoop 13, preferably of a flat section with the long dimension positioned vertically as clearly shown in Fig. 2, abuts and is rigidly fixed to the ends of the arms 13 by the screws 14 which are threaded into the tapped holes in the ends of arms 12. This steel hoop 13 will form a very strong, shock resisting reinforcing member for the molded rim. In case of a crash, the driver's body may be hurled violently forward against the steering wheel. In such case, the steel hoop 13 will prevent the rim from breaking off the end of the spoke and so eliminates the possibility of the outer end of the spoke piercing the driver's body. Since hoop 13 is of flat section with its long dimension vertical the rim may be somewhat flexible in the plane of the rim whereby its strength under shock will be increased. The metal arms 12 preferably have holes 15 bored therein to lighten the casting without materially decreasing the lateral bending strength of the arms, that is, the strength of the arms to carry the steering torque. Also, for the same purpose, arms 12 are preferably cast with lateral flanges as clearly shown in Fig. 1.

Figure 2:
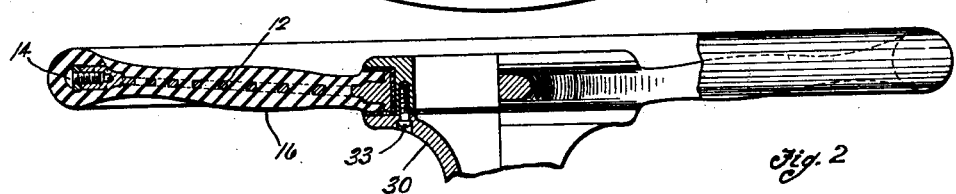
Fig. 2 is a vertical section taken on the line 2—2 of Fig. 1.
Figure 3:
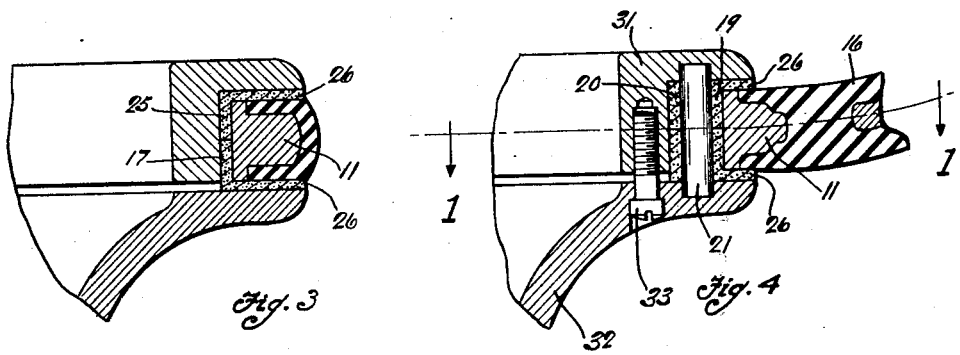
Fig. 3 is a vertical section taken on the line 3—3 of Fig. 1.
Figure 4:
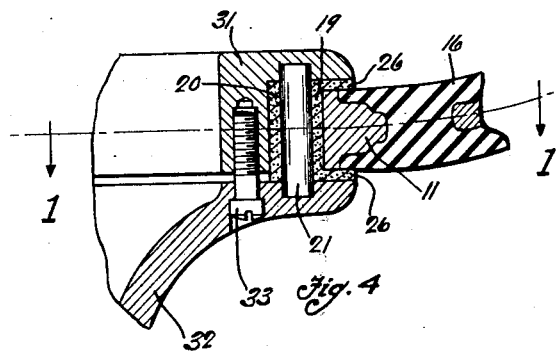
Fig. 4 is a vertical section taken on the line 4—4 of Fig. 1.

The metal spider 10 with hoop 13 fixed thereto are completely covered with the plastic compound of unvulcanized rubber forming the rim and spokes, as clearly shown in Fig. 1, after which it is set within a suitable mold and vulcanized in a well known manner. The hard rubber material covers the metal spokes 12, filling all the holes 15, and forms strong well appearing molded spokes 16 whose configuration is independent of that of the metal spokes 12. Preferably the central metal ring 11 is of the full thickness of the molded spokes 16, as clearly shown in Figs. 3 and 4, to give greater strength to the ring and so that the margin of the central aperture 17 is entirely metal.

A separately made hub 30 is fixed to the above described molded wheel by being set within the aperture 17 but is isolated from the wheel by a soft rubber ring or bushing 25. This bushing 25 is molded in channel shape having the flanges 26 overlapping the top and bottom sides of the margins of the central aperture 17. The metal ring 11 has a plurality of outward radially extending recesses 18 therein. The soft rubber bushing 25 has integral outwardly projecting portions 19 filling the radial recesses 18 except for a central hole 20 in each of said projections 19.

In assembling the parts, the soft rubber ring 25 is inserted in place within the apertures 17 by flexing the ring 25 and the flanges 26 thereon. Dowel pins 21 are inserted within the holes 20 and project above and below the rubber ring 25 as clearly shown in Fig. 4. The separate metal hub 30 is made in two parts, the upper part 31 being set down over the dowel pins 21 from above while the lower part 32 is similarly set in place from below and the two hub parts 31 and 32 are firmly clamped together upon the soft rubber ring 25 by the screws 33. It will now be obvious that the wheel is completely isolated by soft rubber from the metal hub 30 which is adapted to be keyed or suitably fixed to the steering shaft. The steering torque is transmitted from the wheel to the hub 30 by means of the six dowel pins 21 which are also isolated from the wheel by the small rubber bushings 19 surrounding each dowel. It is to be noted that complete failure of the soft rubber will not disable the steering of the vehicle since if the soft rubber were entirely removed, steering torque can still be transmitted from the wheel to the hub 30 by the dowels 21 abutting the side walls of the recesses 18.

The complete isolation of the wheel from the hub greatly reduces the engine vibrations from being transmitted up the steering shaft to the steering wheel, the soft rubber ring 25 acting to absorb and dampen these vibrations. A feature of this invention is the provision of such complete isolation by a relatively small amount of soft rubber.

While the form of embodiment of the present invention as herein disclosed, constitutes a preferred form, it is to be understood that other forms might be adopted, all coming within the scope of the claims which follow.

What is claimed is as follows:

1. A steering wheel spider member having a central aperture, a separate hub member set within said aperture, a soft rubber bushing interposed between said spider member and hub to completely isolate same, and a driving lug projecting from one of said members into a recess in the other of said members whereby driving torque is transmitted between said members.

2. A steering wheel spider member having a central aperture, a separate hub member set within said aperture, and having flanges overlapping the margin of said aperture but spaced therefrom, a soft rubber channel-shaped bushing interposed between said spider member and hub to isolate same, and a driving lug projecting from one of said members into a recess in the other member, said lug being isolated by said rubber bushing from the walls of said recess.

3. A steering wheel spider member having a central aperture and radially extending recesses leading into said central aperture, a soft rubber bushing seated in said aperture and having integral portions projecting into said recesses, a separate hub portion set within said rubber bushing and clamped in place thereupon, said hub having driving lugs projecting into said recesses but isolated from the recess walls by said projecting portions of said rubber bushing.

In testimony whereof I hereto affix my signature.

HARVEY D. GEYER.